Oct. 2, 1945. H. VON BECKERATH 2,385,896

PIEZO-ELECTRIC DEVICE

Filed March 5, 1940

Inventor
HANS VON BECKERATH

By H. S. Snover
Attorney

Patented Oct. 2, 1945

2,385,896

UNITED STATES PATENT OFFICE 2,385,896

PIEZOELECTRIC DEVICE

Hans von Beckerath, Berlin, Germany; vested in the Alien Property Custodian

Application March 5, 1940, Serial No. 322,299
In Germany December 2, 1938

7 Claims. (Cl. 171—327)

The invention relates to an oscillatory crystal, more especially to a quartz crystal which distinguishes itself by a high resonance resistance. The resonance resistance of an oscillation crystal, which depends on the damping of the crystal, is of a comparatively low ohmic order at the generally very low damping of the crystal, when considering one having the customary dimensions and the said ohmic value is a definite one. For many purposes of use such a value of the resonance resistance is disadvantageous, and for this reason the desire exists of operating with a higher resonance resistance. For instance, when using a crystal in a return coupled oscillatory circuit, a comparatively low-ohmic oscillatory crystal operates often in a very unfavorable manner. Such oscillation circuits are usually so designed to advantage that an in-phase feed-back is obtained, and that the quartz crystal oscillates exactly in its longitudinal resonance, which is possible between real values in a voltage divider circuit. The resonance resistance is to be hereby of the same order, and possibly of higher order, than the other resistances in order to maintain a low total damping in the feed-back path. In order to obtain the required feed-back potential, there is required a certain value for the resonance resistance at a given maximum crystal load (current density). Owing to the very low damping of the quartz crystal, the resonance resistance is often too low for the described purpose of use. This disadvantage can be avoided by the use of an oscillation crystal, in accordance with the invention in which without changing the frequency any desired higher resonance resistance can be obtained.

In the oscillation crystal, according to the invention, in at least on one of the surfaces provided with electrodes, the electrode layers are separated into parts insulated from one another. Then, at least one of the parts, insulated from the other electrode parts situated on the same crystal surface, is connected with an electrode which lies opposite the said part on the opposite crystal surface. The oscillatory crystal, in accordance with the invention, is to be conceived as a crystal transformer having two electrode pairs whereby the secondary electrodes are short-circuited, while the one secondary electrode can form a coherent layer with the primary electrode situated on the same crystal surface. In view of the fact that in the oscillation crystal, according to the invention, a part of the layers is short-circuited, any desired higher resonance resistance can be obtained by way of resistance transformation.

The underlying principles of the invention and the description of certain preferred embodiments will now be set forth, reference being made to the accompanying drawing, in which.

Figure 1:
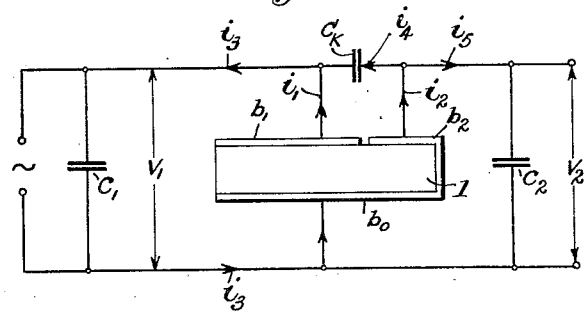
Figure 1 illustrates an end view of a piezo-electric crystal rod and is shown connected to a filter circuit the parameters of which will hereinafter be discussed.

Referring first to Fig. 1, $b_1$ designates the width of the primary layer, and $b_2$ is that of the secondary layer, whereby $b_1+b_2=b$ is the total width. Reference character $c_1$ represents the static capacity of the primary side of the crystal inclusive of the capacity of the leads. Reference character $c_2$ represents the static capacity of the secondary side inclusive of any connected capacity. Reference character $c_k$ represents the coupling capacity between the two layers. The inner resistance of the generator is negligibly small as compared with the other apparent resistances.

Owing to the rigid current ratio $$\frac{i_1}{i_2}=\frac{b_1}{b_2}$$

which is independent of the frequency, a substitution scheme must be obtained which is similar to the completely covered crystals. The equivalent circuit for the fully covered quartz crystal consists, as is known, of a series connection of the values $L_0$, $C_0$, $R_0$ to which the static capacity $C_p$ lies in parallel. Then $i_0$ is the current of the piezo-electric crystal for the fully covered crystal, if at the same frequency it produces the same oscillation amplitude as in the case of the subdivided layers.

Now, in order to ascertain the substitution quantities L, C, R, which correspond to the quantities $L_0$, $C_0$, $R_0$ of a completely covered crystal, there is introduced a transformation ratio similarly to the case of the transformer, namely:

$$u = \frac{b_2}{b_1}$$

Hence the equation exists:

$$\frac{i_0}{b_1+b_2} = \frac{i_1}{b_1} = \frac{i_2}{b_2}$$

$$i_2 = u \cdot i_1$$

$$i_0 = (1+u)i_1 = \left(1+\frac{1}{u}\right)i_2$$

When causing the crystal to oscillate, the currents $i_1$ and $i_2$ flow. Owing to $i_1$ and $i_2$ having the same phase all currents indicated in Fig. 1 have the same phase. The current flowing through the generator is expressed as follows:

$$i_3 = i_1 + i_4$$

$$i_4 = i_2 \frac{c_k}{c_2+c_k}$$

$$i_3 = i_1 + i_2 \frac{c_k}{c_2+c_k} = i_1 \left(1 + u \frac{c_k}{c_2+c_k}\right) = i_0 \left(\frac{1}{1+u}\right)\left(1 + u \frac{c_k}{c_2+c_k}\right)$$

If $c_k$ and $c_2$ are assumed to be free from losses, the effective power supplied by the generator should be equal to the loss power of the fully covered crystal.

$$i_3^2 R = i_0^2 R_0$$

In view of the fact that in both cases the oscillating mass performs the same movement, also all the apparent powers must be equal:

$$i_3^2 \omega L = i_0^2 \omega L_0$$

The capacitive apparent power is higher as compared with that of the fully covered quartz crystal, since the current $i_2$ passes through the capacitives $c_k$ and $c_2$, hence:

$$\frac{i_3^2}{\omega C} = \frac{i_0^2}{\omega C_0} + \frac{i_2^2}{\omega(c_2+c_k)}$$

It follows, therefore, that:

$$R = R_0 \left(\frac{1+u}{1+u\frac{c_k}{c_2+c_k}}\right)^2$$

$$L = L_0 \left(\frac{1+u}{1+u\frac{c_k}{c_2+c_k}}\right)^2$$

$$C = C_0 \left(\frac{1+u\frac{c_k}{c_2+c_k}}{1+u}\right)^2 \cdot \frac{c_2+c_k}{C_0\frac{1}{\left(1+\frac{1}{u}\right)^2} + C_2 + C_k}$$

$$C_p = C_1 + \frac{c_2 \cdot c_k}{c_2+c_k}$$

Now, if the secondary side is short-circuited then $c_2 = \infty$ $$R = R_0 \cdot (1+u)^2$$
$$L = L_0 \cdot (1+u)^2$$
$$C = C \cdot \frac{1}{(1+u)^2}$$

Hence, only as regards resistance does the crystal appear to be transformed upwards in the ratio $(1+u)^2$ without a frequency variation being thereby entailed. In a rod-shaped crystal according to the figure which oscillates longitudinally the transformation ratio is the proportion between the widths of the layers and, generally speaking, the electrode areas are proportional to the piezo-electric charges. The derived formulas are correct in the same degree also in plate crystals or in other crystal shapes which carry out oscillations in the thickness thereof. But it is hereby presupposed that the entire surface represents a wave front. The quantity $u$ would then be the ratio between the surfaces of the separated layers.

In a numerical example the resistance transformation can be clearly illustrated. Thus, in a rod-shaped quartz crystal having the dimensions 27 x 12 x 1.5 mm., and at a resonance frequency of 100 kc. in the fully covered state, the impedance is found to be $Z_0 = \omega L_0 = 2.5 \cdot 10^7$ ohm. When assuming a quality value equal to $$\rho = \frac{\omega L_0}{R_0} = 2 \cdot 10^5$$

then the value $R_0$ equals 125 ohm. Now, if the layer of such a crystal is divided up and the transformation ratio $u = 3$ is chosen, then there is $b_2 = 9$ mm. and $b_1 = 3$ mm. In this case:

$$Z = Z_0 \cdot (1+u)^2 = 4 \cdot 10^8 \text{ ohm}$$
$$R = R_0 \cdot (1+u)^2 = 2000 \text{ ohm}$$

When producing a crystal in accordance with the invention the steps may be as follows: The crystal is next provided with a complete layer and then by milling a groove parallel to the longitudinal edge, the metal layer of a surface is divided into two parts insulated from one another. The layer of the one partial surface is then suitably passed around the quartz crystal so that it is in a direct conductive connection with the undivided layer on the opposite crystal surface.

Figure 2:
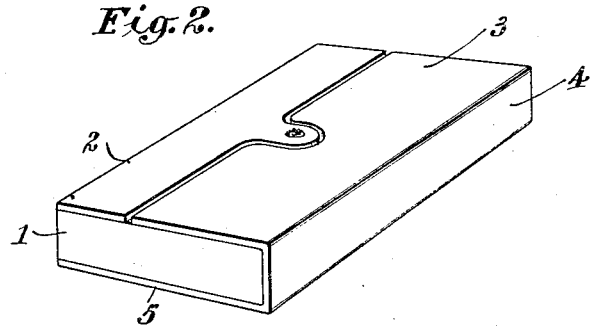
Fig. 2 shows in perspective the piezo-electric device according to Fig. 1.

An example of construction of such a crystal is shown in Fig. 2. On the surface on top of the crystal 1 the layer 2 is insulated from the partial layer 3. The layer 3 is connected with the layer 5 arranged on the bottom surface of the crystal, whereby the said connection is provided through a layer 4 which is situated on the side face of the crystal. In the case of a longitudinally oscillating rod the separating line between the layers 2 and 3 extends preferably parallel to the edge whose length determines the frequency. In the example of construction shown, the transformation ratio is greater than 1. Hence, the separating line lies on the left half of the crystal so that the mounting place, which is at the same time also the place for the current supply line, is situated in a region which can be assigned, by passing around the separating line, to the narrow electrode strip. Then the connections are, on the one hand, at the electrode layer 2, and on the other hand, at the electrode layer 5.

Figure 3:
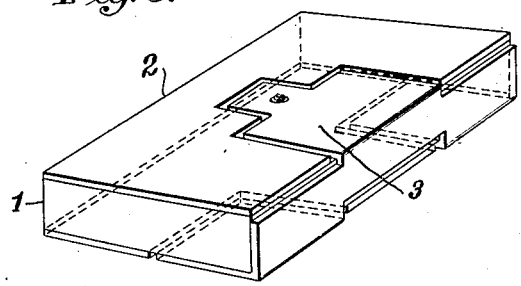
Fig. 3 shows in perspective an alternative arrangement of electrodes adjacent the surfaces of the piezo-electric crystal.

Fig. 3 shows a further example of construction in which the crystal oscillates in a higher harmonic. The crystal then oscillates, for instance, in the third harmonic. By means of a corresponding adaptation of the separating line between the electrode layers 2 and 3 there is likewise produced a crystal with a resistance transformation.

The configuration of the electrode plates 2 and 3 on the crystal 1, as shown in Fig. 3, may be varied within wide limits. However, I have found it preferable to arrange the folded electrode 3 so that the portion covering part of the upper face of the crystal does not register with portions covering parts of the lower crystal face. Substantially all of one longitudinal edge of the crystal is, however, covered by the electrode 3.

I claim:

1. A piezo-electric device comprising a crystal element having two opposing faces and four edge surfaces, one electrode fully covering one face and one edge surface and covering a portion of the other face, and a second electrode covering substantially the remainder of said other face.

2. A piezo-electric device vibratable in the lengthwise mode and constituted by a quartz crystal element having the shape of an elongated rectangular parallelopiped and having electrodes of unequal area, one of said electrodes being folded over a longitudinal edge of said element and covering unequal portions of the crystal faces, at least half of the crystal faces being covered by mutually opposed portions of said one of the electrodes, thereby to short-circuit certain charges of opposite sign which are produced on said crystal faces.

3. In a piezo-electric device constituted by a quartz element and a plurality of electrodes disposed against certain of the surfaces of said element, means for producing a relatively high resonance impedance by short-circuiting at least half of the electrode surfaces which lie on opposite sides of said element, and means including a portion of one of said electrodes formed about one edge of said element for connecting two mutually insulated ones of said electrodes to a utilization device.

4. In a device according to claim 3, the arrangement of electrodes on the surfaces of said quartz element which provides insulative separation of certain electrodes on one face of said element, the separation being principally along a line extending parallel to the longest axis of the element.

5. A piezo-electric device having a relatively flat crystal element, one electrode being folded over an edge surface and extending over mutually opposed areas of opposite faces and over an additional area of one face, and at least one other electrode substantially covering the remaining areas of said crystal faces, said opposed areas being at least as large as said one other electrode.

6. A piezo-electric device having a crystal element, the principal faces of which are substantially covered with electrodes, certain mutually opposed portions of said principal faces being covered by a single one of said electrodes which is folded over at least half of the crystal and around an edge surface of the crystal, and said device being vibratable in the longitudinal mode.

7. A device in accordance with claim 6 in which certain opposed portions of the crystal faces are covered by different ones of said electrodes respectively.

HANS VON BECKERATH.